United States Patent [19]

Kamimura

[11] 4,269,474
[45] May 26, 1981

[54] WIDE-ANGLE OPTICAL DOOR VIEWER

[76] Inventor: Yasushi Kamimura, 3-3, Chuou 2-chome, Outa-ku, Tokyo, Japan

[21] Appl. No.: 70,489

[22] Filed: Aug. 28, 1979

[30] Foreign Application Priority Data

Jan. 31, 1979 [JP] Japan .................................. 54-9080

[51] Int. Cl.³ .............................................. G02B 7/02
[52] U.S. Cl. ...................................... 350/69; 350/453
[58] Field of Search .................... 350/69, 319, 212, 78, 350/220, 230, 67

[56] References Cited

U.S. PATENT DOCUMENTS

| | | | |
|---|---|---|---|
| 3,514,188 | 5/1970 | Blosse et al. | 350/319 |
| 4,116,529 | 9/1978 | Yamaguchi | 350/319 |
| 4,172,636 | 10/1979 | Yanagimachi | 350/69 |
| 4,175,824 | 11/1979 | Daley | 350/69 |

*Primary Examiner*—Jon W. Henry
*Attorney, Agent, or Firm*—Toren, McGeady and Stanger

[57] ABSTRACT

This invention provides an improvement of a wide-angle optical door viewer having a wide-angle optical system for bringing into view more than 190 degrees of vision, which is set through a wall, a door or the like to enable viewing of an object located outside the door from the inside of the door. The system is composed of an assembly of a first objective having surfaces with different curvatures on opposite sides, a second objective having a concave surface with a special curvature on one side and a flat surface on the opposite side, a third objective having concave surfaces of different curvature on both sides, and an eyepiece. A cylindrical sleeve for maintaining the focal length is placed between the third objective and the eyepiece, and a colored filter is placed at an appropriate location with the lenses assembled in parallel into an inner tube from one end thereof, the inner tube being screwed and set into an outer tube.

1 Claim, 6 Drawing Figures

WIDE-ANGLE OPTICAL DOOR VIEWER

BACKGROUND OF THE INVENTION

This invention relates to an improvement of a wide-angle optical door viewer being set through a door or the like, by which from inside of the door any person or a material object of the outside is able to be certainly watched in the wide-angle in accordance with preparation of the wide angle vision.

Conventionally, in a house, hotel or office, a door viewer was set to quickly watch, without being noticed by anyone or a visitor come abruptly, for prevention against crimes. However, in view of a substantial construction that the inside diameter of a cylindrical member of the assembled door viewer is limited to a small size about 9.5 mm, it is known that it is difficult to come into sight more than 190 degrees of the field of the outside vision and it is difficult to realize such wide-angle outside vision under a circumstance of requirement of miniaturization of the cylindrical member being assorted each lens therein. Also it was required very complex steps for manufacturing the all parts and assembling thereof. In this field, it is well known that the conventional door viewer is comprised of assembled two objectives and one eyepiece, and that the conventional construction which is put the outer tube through the wall of the door is set by means of a threaded inner sleeve, a threaded tube and a "C" shaped spring without any binding agent, and that other fixing means for the both members of the conventional door viewer of binding by the both flanges of the inner and outer tubes provides the male screw on the outer surface of the inner tube and the female screw on the inner surface of the outer tube, which the both flanges are exposed from the surface of the door, and the both tubes are screwed on the above stated screws.

U.S. Pat. No. 4,082,434 to Hayashi et al discloses a wide-angle optical system for door viewer which includes an inner sleeve illustrated in FIG. 1 of that patent wherein the opetical system of the two objective lenses and one eyepiece is assorted with each inner and outer tube and the inner sleeve. It is generally recognized that the inner sleeve or the lens tube 118 operates only as a stopper of the second objective lens from an embodiment illustrated in FIG. 7, since a convex lens 113 is appropriately positioned in the inner sleeve 118 or the like to coincise the both focal points $F_1$ and $F_2$.

A patent to Yamaguchi, U.S. Pat. No. 4,116,529 discloses a wide-angle spyglass comprising three lenses, a threaded inner sleeve and a threaded cylindrical member and a C-shaped spring for a stopper of an eyepiece. The threaded inner sleeve operates concurrently as the lenses stopper and an inner tube to fix thereof in an outer sleeve, since an objective is firstly fitted in the barrel member before the wide-angle lens and its fixture member are mounted to the barrel member.

A Japanese Utility Model Publication No. 22057/1971 of application to Yamaguchi discloses a wide angle door scope which includes an embodiment illustrated in FIG. 2 of that Utility Model Application wherein four lenses are assorted in the inner sleeve, and the third concave lens has a front concave surface and a rear flat surface, also an eyepiece is resiliently fixed on the inner peripheral surface of the inner sleeve. It is generally recognized that the inner sleeve operated the lenses stopper and a fixing member thereof in an outer sleeve.

SUMMARY OF THE INVENTION

The door viewer of the present invention comprises substantially one optical assembly consisting of a first large diameter objective, a second objective, and a third objective which is especially and utilizedly formed the respective concave front and rear surfaces to shorten the focus having the same diameter as the second objective, and an eyepiece having the same diameter as said second and third objectives, and both inner and outer tubes, a focus length keeper cylindrical sleeve which has an appropriate length considering the focus of the lenses, and a threaded stopper ring which covers the first objective. And further, the door viewer of the present invention is able to be attached a colored filter to make Haze-Cut Effect by extinction of short wave length rays of the Sunbeams or the like.

Accordingly, a principal object of the present invention is to provide a wide-angle door viewer for coming certainly into sight about more than 190 degrees to approximately 200 degrees of the outside vision of the door by a small sized door viewer comprising three objectives and one eyepiece optical system.

Another object of the present invention is to provide a door viewer comprising of one optical lenses assembly and cylindrical members as a supporter or maintainer to easily set the lenses assembly therewith without any binding materials or agents.

A further object of the present invention is to provide a door viewer having a focus length keeper or a focus cylindrical sleeve which is placed between the eyepiece and the third objective for absorption of diffused reflection within the cylindrical sleeve and for keeping softly the glass lenses therein, and for further concurrent operations as the focus length keeper and as a stopper of the lenses.

A still further object of the present invention is to provide a simple door viewer comprising of only four elements that one is an assembly of four lenses consisting from the three objectives and one eyepiece with the focus length keeper cylindrical sleeve, other are both inner and outer tubes, and a threaded ring of a frame, therefore it can be realized to make cost down of manufacturing thereof in accordance with omission of other unnecessary members and steps for construction thereof.

Suitable a further object is to provide a door viewer having a colored filter which is positioned at a proper place thereof to make Haze-Cut Effect by extinction of short wave length rays of the Sunbeams or the like.

Other objects and many of the attendant advantages of this invention will be readily appreciated as the same become better understood by reference to the following description on bases of the attached drawings.

BRIEF DESCRIPTION OF THE DRAWINGS

The accompanying drawings illustrate the preferred embodiments of the present invention. In the drawings, the same reference numerals illustrate the same parts of the invention, in which.

THE DETAILED DESCRIPTION OF THE INVENTION

Figure 1:
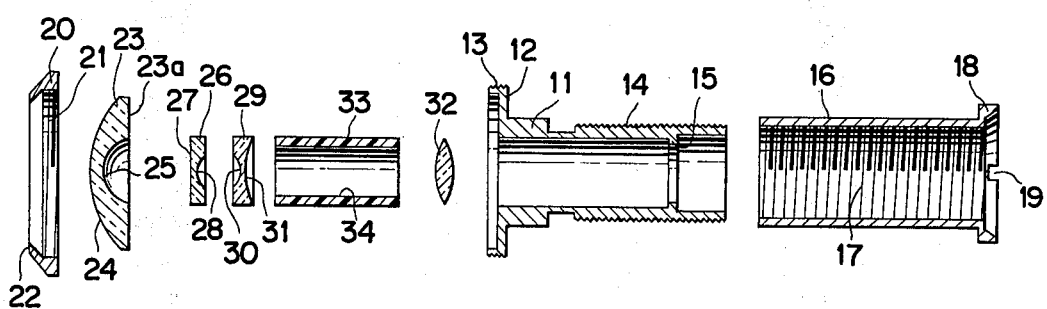
FIG. 1 is an exploded sectional view indicating the relationship of the elements of a door viewer.

Attention is turned in the detailed description of the present invention as illustrated in the accompanying drawings wherein there is shown preferred embodiments of the invention. With regard to one embodiment of the present invention, an inner tube 11 comprises from a cylindrical member and a flange 12 at one end of the cylindrical member and both male screws 13 and 14 are respectively formed on the both outer peripheral surfaces of the flange and the cylindrical member, and the male screw 14 is provided about two-thirds of the length from the right end of the left direction of the inner tube as shown in FIG. 1, also an annular flange 15 is formed at the near portion from the right end on the inner surface of the tube 11.

An outer tube 16 of a cylindrical member is also formed a female screw 17 on an inner peripheral surface to be screwed on the above stated male screw 14 of the inner tube 11. And another flange 18 is provided at an end of the tube 16 as shown in FIG. 1, on which at least one notch 19 is provided for rotation of the tube 16 to be engaged with the inner tube 11 by rotatable means which is not shown.

A stopper ring 20 comprises a tapered annular flange 22 having a tapered inner diameter, and a cylindrical base as shown in FIG. 1. The cylindrical base has a female screw 21 on the peripheral inner surface for engagement with the male screw 13 providing on the surface of the flange 12 at the front portion of the said inner tube 11.

With regard to the optical lenses system, a first objective 23 has comparatively large diameter than other objective, and is formed to have a convex surface 24 having a large curvature diameter at front surface, also is formed to have a concave surface 25 having a small curvature diameter than the front curvature at the rear center portion. And, a second objective 26 is formed a flat surface 27 on one surface to contact with said first objective, and is formed a concave 28 having a small curvature diameter on another surface at the center portion. Also, a third objective 29 has a same diameter with the second objective, and is formed a concave 30 having the same side curvature diameter at the front surface with the curvature diameter of the second objective to connect with the rear surface having the concave 28 of said second objective, and the third objective 29 is formed another concave 31 having a large curvature diameter at the other surface to shorten the focus length thereof. Further an eyepiece 32 has the same diameter with the second and third objectives, and is provided each convex surface on the both sides.

A focus length keeper 33 or a focus length sleeve member is provided to have an appropriate length considering the focuses of the lenses, and preferably is made from synthetic resin or the like to softly contact with the lenses.

Figure 2:
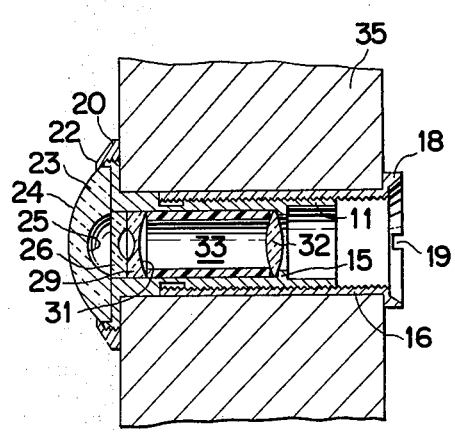
FIG. 2 is a sectional side view of the door viewer setting through the door or the like showing a condition of arrangement of each element shown in FIG. 1.
Figure 6:
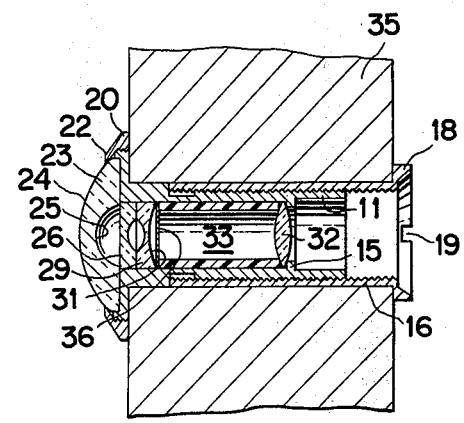
FIG. 6 shows another embodiment of the door viewer assorted further a colored filter therein, and is a sectional side view of the door viewer showing a condition of arrangement of the basic structure and the colored filter.
Figure 4:
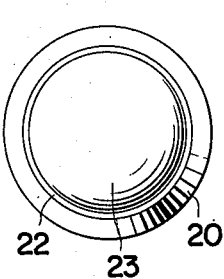
FIG. 4 is a front view of the door viewer looking from the left hand direction of the FIG. 3.
Figure 3:
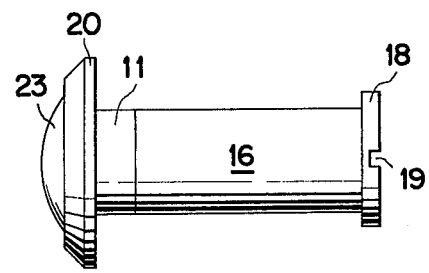
FIG. 3 is a side view of the door viewer.
Figure 5:
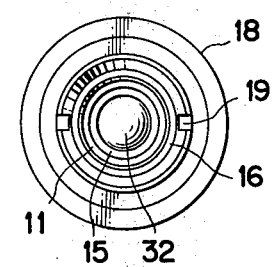
FIG. 5 is a rear view of the door viewer looking from the right hand direction of the FIG. 3.

The first, second and third objectives, and the eyepiece are set on the optic axis through the focus length keeper sleeve 33 and then make an assembly of the optical means. With regard to the assembling of the door viewer, firstly, the eyepiece 32 is inserted into the inner tube 11 so as to engage with the annular flange 15, and then the focus length keeper sleeve 33 is inserted into the tube 11 to contact with the eyepiece and to hold it with the annular flange 15, and so the second and third objective 26 and 29 are set on the end of the focus length keeper sleeve 33 so as to arrange thereof on the optic axis. The axially directed length, in total, of the eyepiece 32, the focus length keeper sleeve 33 and the second and third objective 26 and 29 corresponds to the length from the flange 15 to the front end opening of the cylindrical part of the inner tube 11 as shown in FIG. 2.

The first objective 23 is put within the flange 12 of the inner tube 11 so as to contact the flat annular surface of the objective 23 with the front surface of the flange, and to front with the second objective 26, and then the stopper ring 20 is put on the flange 12 and is screwed to engage the female screw 21 provided on the inner peripheral surface with the another male screw 13 provided on the outer peripheral surface of the flange 12 of the tube 11. Accordingly, the all lenses assembly or the optical system is arranged in the inner tube 11, since the stopper flange 22 of the stopper ring 20 is engaged and pressed down at the base of the first objective 23.

On the flat surface of the first objective without any other curved surface 24 and 25, shielding light paints 23a as black color or other deep color of interrelated color with such black color are painted, if desired. When the painted surface is connected to the front surface of the flange 12 of the inner tube 11, buffer or shock absorber effect at the connecting portion thereof is well expected in addition to such shielding light purpose.

With regard to an objective's focus length and visual angle, the visual angle widens in proportion to shortening of the focus length of the objective. In the present invention, it is required to shorten the focus length of the objective to widen the visual angle of the outer field. Since the second objective 26 has the limit to shorten the focus length thereof, the third objective 29 is shortened the focus length by preparation of the concave 31 in addition to the another concave 30, therefore the visual angle of the door viewer becomes wider. This is one of the most important features of the present invention.

With regard to another embodiment of the present invention to make Haze-Cut Effect in the lenses assembly of the door viewer to clear up the hazy phenomenon occurred in the atmosphere, the embodiment provides a colored filter between the optical lenses. Generally, the hazy phenomenon occurs through stream or other corpuscles by diffusion of purple blue or other short-wave rays of the Sunbeams, artificial daylight or the like, and is visible with nattier blue, therefore, definition, vividness degree or transparency in sight is influenced and diminished by the hazy phenomenon. Since a yellow colored filter absorbs much of these purple, blue and other short-wave rays of such Sunbeams, when used the colored filter, it is expected the Haze-Cut Effect absorbing such hazy nattier blue and clearing the sight with the colored filter.

Therefore, as one of other good embodiment of the present invention, a door viewer having such yellow or light blue colored filter 36 consisted from a thin plate of synthetic resins between the third objective 29 and the focus length keeper sleeve 33 is provided to obtain such transparency of the clear sight of the outer field through the door viewer by using of the Haze-Cut Effect absorbing such short-wave rays of the Sunbeams of the like.

Even if the haze phenomenon occurs in sight by incidence of such short-wave rays through said stream or other corpuscles and diffusion thereof, it is able to obtain the good transparent sight through the colored filter 36 by which said short-wave rays are absorbed. In the above-stated embodiment, the filter 36 is placed between the third objective and the end of the focus length keeper sleeve 33, however, the place of the filter is not limited to said place and the filter is able to be positioned at the front or rear portion of the second objective 26 or at any place in the door viewer. Also the color of the filter is not limited to the yellow or light blue, and any suitable and appropriate color to absorb such the nattier blue and to clear the hazed light is able to be used to the filter. Further, the materials of the filter are not also limited to the synthetic resins, and glass or any other kind of transparent of limpid colorable materials are used as the filter of the present invention.

One of the principal features of the present invention is to provide the wide-angle vision of the outer field about more than 190 degrees by the four lenses system comprising of three objectives group and one eyepiece. It is realized to obtain magnifying of the degree of the field of vision more than 190 degrees to about 200 degrees as stated above by shortning of the focus length in accordance with preparation of the concave 31 having comparatively large curvature diameter on the rear surface of the third objective 29 in addition to preparation of the concave 30 on the front surface thereof and other concave 28 of the second objective, which the both concaves 28 and 30 have respectively and comparatively small curvature diameter on the second and third objectives 26 and 29 at the facing portion each other as shown in FIG. 1.

The other features of the present invention are to provide the most preferably and easily tight and secure connecting with the three objectives assembly and the eyepiece through the focus length keeper sleeve 33 in parallel manner on the optic axis. In this case, since the focus length keeper sleeve 33 is formed to have the focus length of the lenses and is made from the synthetic resins which are hard less than glass or metal materials, the sleeve 33 does not damage the surface of the lenses and is possible to be formed as one body and to be made mass production. The present focus length keeper sleeve keeps the focus length of the lenses therein and concurrently operate as a stopper of the lenses in the inner tube 11. Such connecting of the sleeve 33 with these lenses is very well in addition to easy arrangement of the focus length, and processing on the inner peripheral surface 34 of the sleeve 33 by painting of the optionally chosen black color or other interrelated color with such black color for prevention from diffused reflection of light is also easy.

Still further feature of the present invention is that the construction of the tube members supporting lenses assembly being set therein is very simple and the necessary elements are a few. Namely, as shown in FIG. 2, with regard to the arrangement condition, the lenses assembly is supported and kept certainly by only one inner tube 11 and the stopper ring 20 therein.

As stated above, the process of assembling of the door viewer is that firstly the eyepiece 32 and the focus length keeper sleeve 33 are inserted into the tube 11 from only one end opening to lie one upon another on the inner flange 15, further, the second and third objective 26 and 29 are inserted in the tube 11 in the manner of putting one upon another to contact the relatively large curvature diameter surface of the third objective 29 with the end of the focus length keeper sleeve 33. In this condition, the opening of the tube 11 is closed by the second objective, since the length of the tube 11 is designed to be filled up with these elements.

Then the first objective 23 is placed on the front of the flange 12 of the inner tube 11 and concurrently on the end of the second objective, and so the stopper ring 20 is covered the first objective and the female screw 21 of the ring 20 is engaged with the male screw 13 of the inner tube 12. Accordingly, the stopper flange 22 of the stopper ring 20 pushes the peripheral base of the convex surface 24 of the first objective 23. Therefore all lenses assembly is easily assorted in the inner tube 11 with the stopper ring 20. The above stated inner tube 11 which includes the necessary lenses assembly is inserted into a hole provided through the door or the like from the out side, and then the outer tube 16 is inserted in the hole from the inside and the male screw 14 of the inner tube 11 and female screw 17 of the outer tube 16 are engaged by driving thereof with the notch 19. At the place that the both flanges 12 and 18 of the both tubes contact on the both surfaces of the door, the door viewer is certainly put between the door as well shown in FIG. 2.

As one example of the present invention, with regard to the each size of the necessary elements exploted in FIG. 1, the outer diameter of the focus length keeper sleeve 33 is 9.5 mm and the inner diameter thereof is 6 mm, and each diameter of the eyepiece 32, second and third objectives 26 and 29 is 9.5 mm respectively, and these assembly is assorted into the inner tube 11 having a slightly large inner diameter than the outer diameter of the focus sleeve 33 and of said lenses. The diameter of the first objective 23 is 21 mm and the objective contacts with the front face of the flange 12 of the inner tube 11.

However, each size of these necessary elements is not limited to the above stated size of only this example, and such size and shape thereof shall be changed and also considered in accordance with suitable requirement of the subject. Any change and other embodiment on design with regard to the four lenses assembly and focus length keeper sleeve shall be included in the scope of the claims of the present application.

The wide-angle door viewer of the present invention has wide-angle vision of the outer field which was not expected in past, and dissolves the dead angle to about 200 degrees which is coming into the sight thereof, so the present door viewer is fully effective for prevention against crimes in addition to a very few of the necessary elements or members of the assembly and easy of manufacturing thereof and also assorting is very simple and easily proceeded, and then the present door viewer is provided at economically low cost. Therefore, many prominent and excellent features of the present invention shall manifestly be made from the above description.

What is claimed is:

1. A wide angle lens assembly having an object side and a viewing side consisting of a first lens member having a convex surface on the object side thereof and a concave surface on the viewing side thereof; a second lens member having a planar surface on the object side thereof and a concave surface on the viewing side thereof arranged adjacent said first lens member on the viewing side thereof; a third lens member having a concave surface on both the object side and the viewing side thereof, with the concave surface on said viewing side having a diameter which is larger than the diameter of the concave surface on its object side, said third lens member being arranged adjacent said second lens member on the viewing side thereof; an eyepiece having a convex surface on both sides thereof spaced a predetermined distance from said third lens member on the viewing side thereof; a sleeve member arranged to maintain said eyepiece and said third lens member operatively mounted within said assembly and spaced apart said predetermined distance; and means maintaining said lens assembly operatively joined together to enable a viewer on said viewing side thereof to see an object on said object side thereof, with the diameter of said concave surface on said viewing side of said third lens member being dimensioned to provide for said lens assembly a viewing angle of at least 190 degrees.

* * * * *